United States Patent
Matousek et al.

(10) Patent No.: US 9,901,030 B2
(45) Date of Patent: Feb. 27, 2018

(54) REAR GRAIN CART GRAIN HANDLING ASSEMBLIES FOR AN AGRICULTURAL HARVESTING COMBINE

(71) Applicant: Tribine Industries LLC, Logansport, IN (US)

(72) Inventors: Robert A. Matousek, Valley Center, KS (US); Roger Baber, Galvaston, IN (US); Reinhold A. Herrman, Manhattan, KS (US); Ben N. Dillon, Logasport, IN (US)

(73) Assignee: Tribine Industries LLC, Logansport, IN (US)

( * ) Notice: Subject to any disclaimer, the term of this patent is extended or adjusted under 35 U.S.C. 154(b) by 241 days.

(21) Appl. No.: 14/946,842

(22) Filed: Nov. 20, 2015

(65) Prior Publication Data
US 2017/0142899 A1 May 25, 2017

(51) Int. Cl.
*A01D 41/12* (2006.01)
*A01D 61/00* (2006.01)
*B65G 33/26* (2006.01)

(52) U.S. Cl.
CPC ..... *A01D 41/1217* (2013.01); *A01D 41/1208* (2013.01); *A01D 61/008* (2013.01); *B65G 33/26* (2013.01)

(58) Field of Classification Search
CPC ............ A01D 41/1217; A01D 41/1208; A01D 61/008; A01D 90/02; A01D 90/10; A01D 90/16; B65G 67/04; B65G 67/24; B65G 33/14; B65G 33/26; B65G 33/265; B65G 2814/0326; B65G 2814/0328; B60P 1/40; B60P 1/42
See application file for complete search history.

(56) References Cited

U.S. PATENT DOCUMENTS

| 3,549,026 A | * | 12/1970 | Klee | A01D 41/1208 414/300 |
| 3,825,138 A | * | 7/1974 | Pool | A01D 41/1217 198/586 |
| 4,037,745 A | * | 7/1977 | Hengen | A01D 41/1217 198/668 |
| 4,428,182 A | * | 1/1984 | Allen | A01D 41/1208 280/492 |
| 5,409,344 A | * | 4/1995 | Tharaldson | B60P 1/42 198/314 |

(Continued)

*Primary Examiner* — Glenn F Myers
(74) *Attorney, Agent, or Firm* — Mueller Law, LLC; Jerry K. Mueller, Jr.

(57) ABSTRACT

Disclosed is a grain harvesting articulated combine of a forward PPU, a rear grain cart, and an articulation joint that connects the forward PPU with the rear grain cart. The rear grain cart includes an ascending lift auger assembly that receives clean grain from the forward PPU and transports it upwardly for dumping into the rear grain cart. A generally horizontal drag auger assembly moves clean grain to a lower a lift auger assembly. A clean grain off-loading auger assembly is connected to the lower lift auger assembly by a slew bearing. The clean grain off-loading auger is retractable about its upper end and its upper end assembly is terminated with a spout adapted to direct clean grain generally downwardly. The clean grain off-loading auger assembly is rotatable from a grain off-loading position to a home position.

19 Claims, 15 Drawing Sheets

(56) References Cited

U.S. PATENT DOCUMENTS

| | | | |
|---|---|---|---|
| 6,350,197 B1 * | 2/2002 | Cooksey | A01F 12/46 460/114 |
| 8,434,624 B2 * | 5/2013 | Redekop | A01D 90/02 209/137 |
| 8,435,104 B2 * | 5/2013 | Dillon | A01D 41/1208 460/100 |
| 9,211,830 B1 * | 12/2015 | Hensley | B60P 1/42 |

* cited by examiner

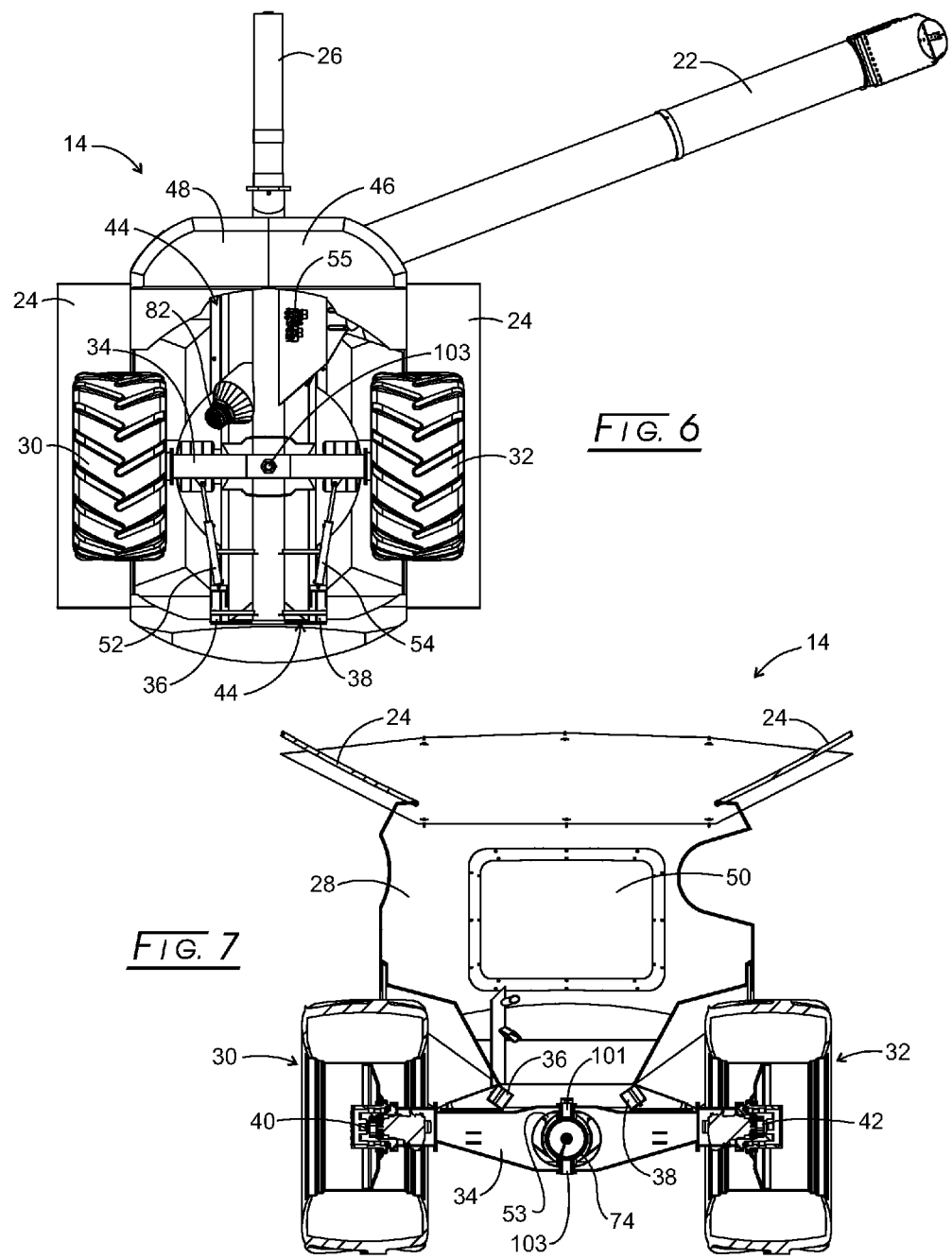

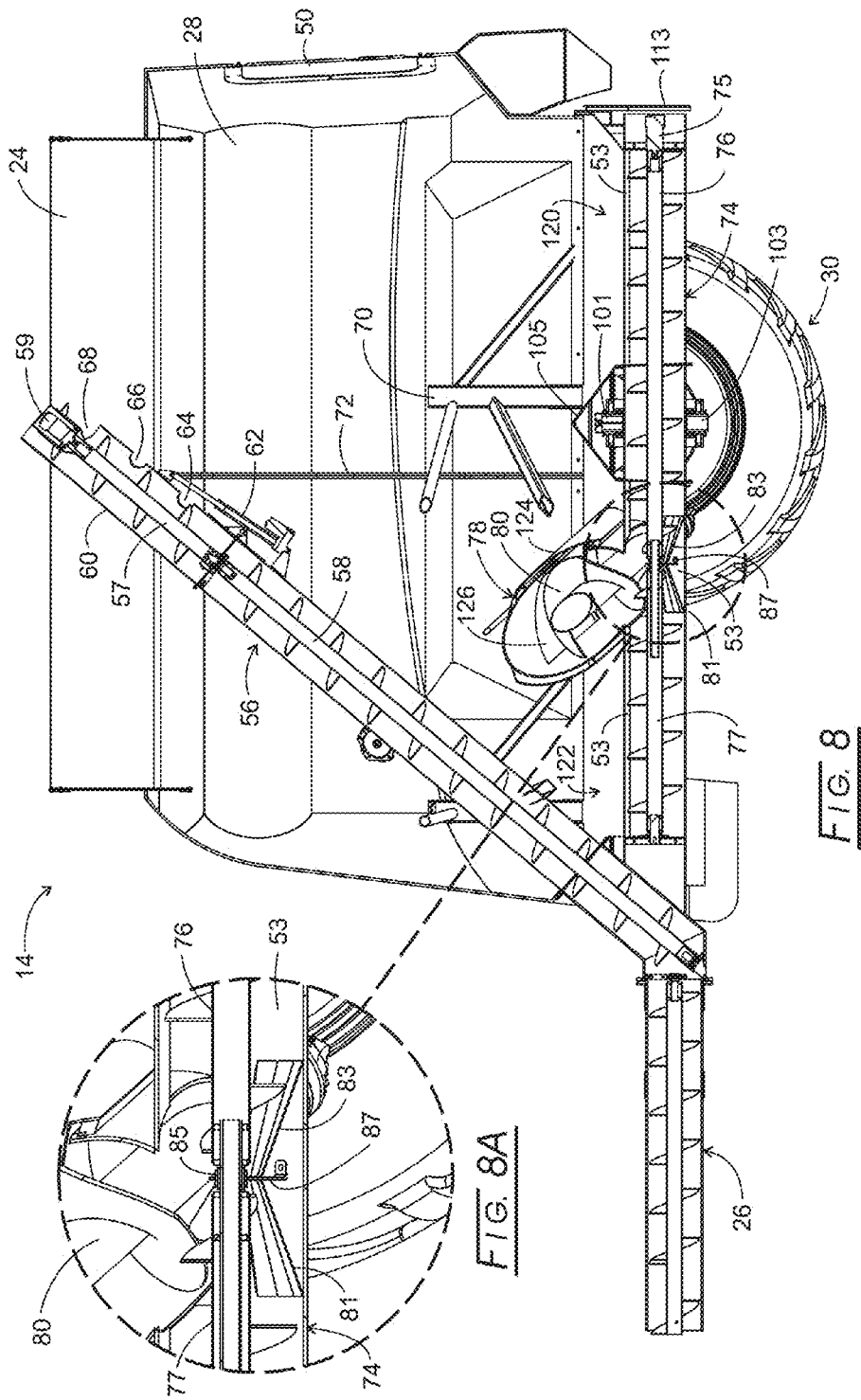

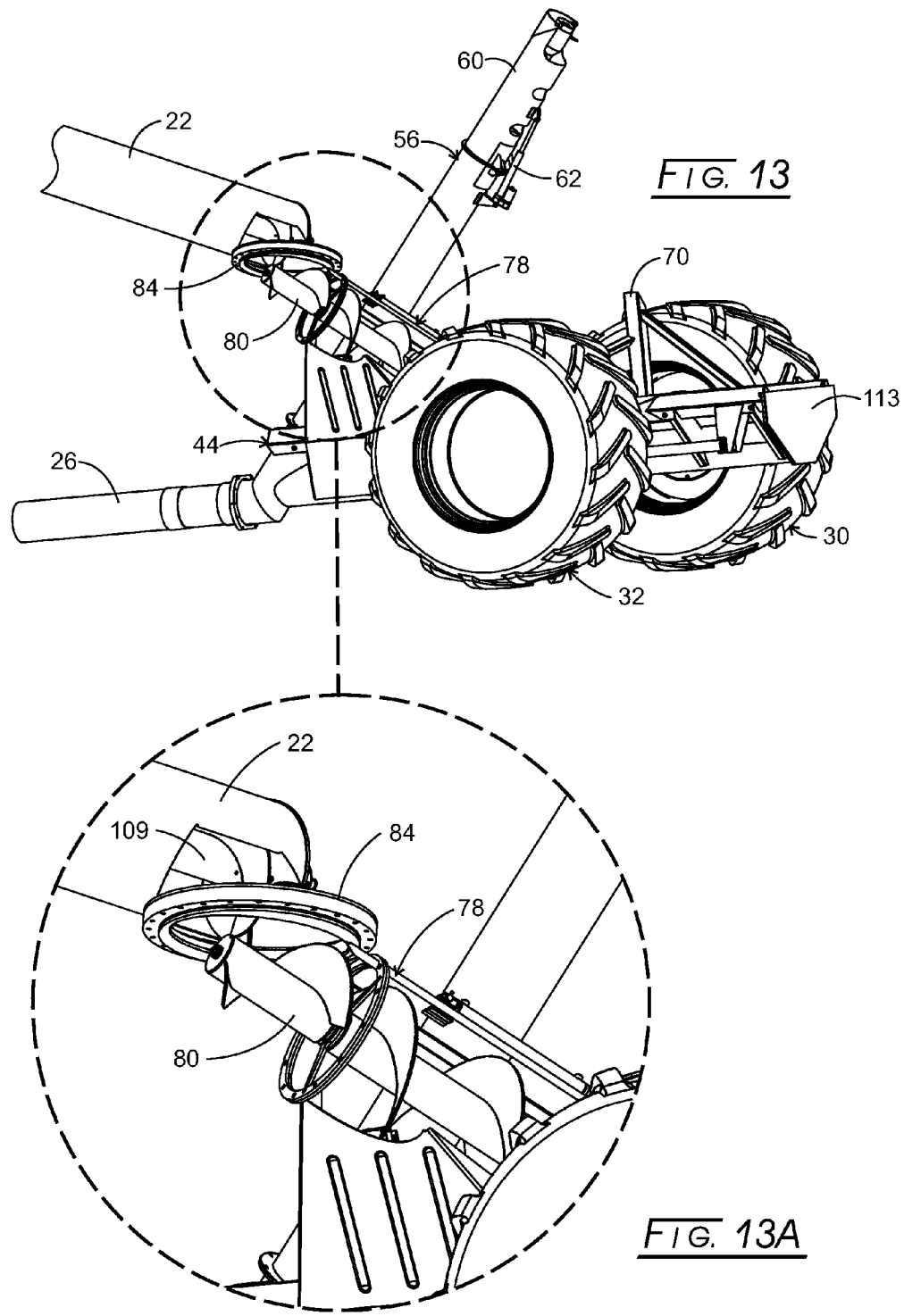

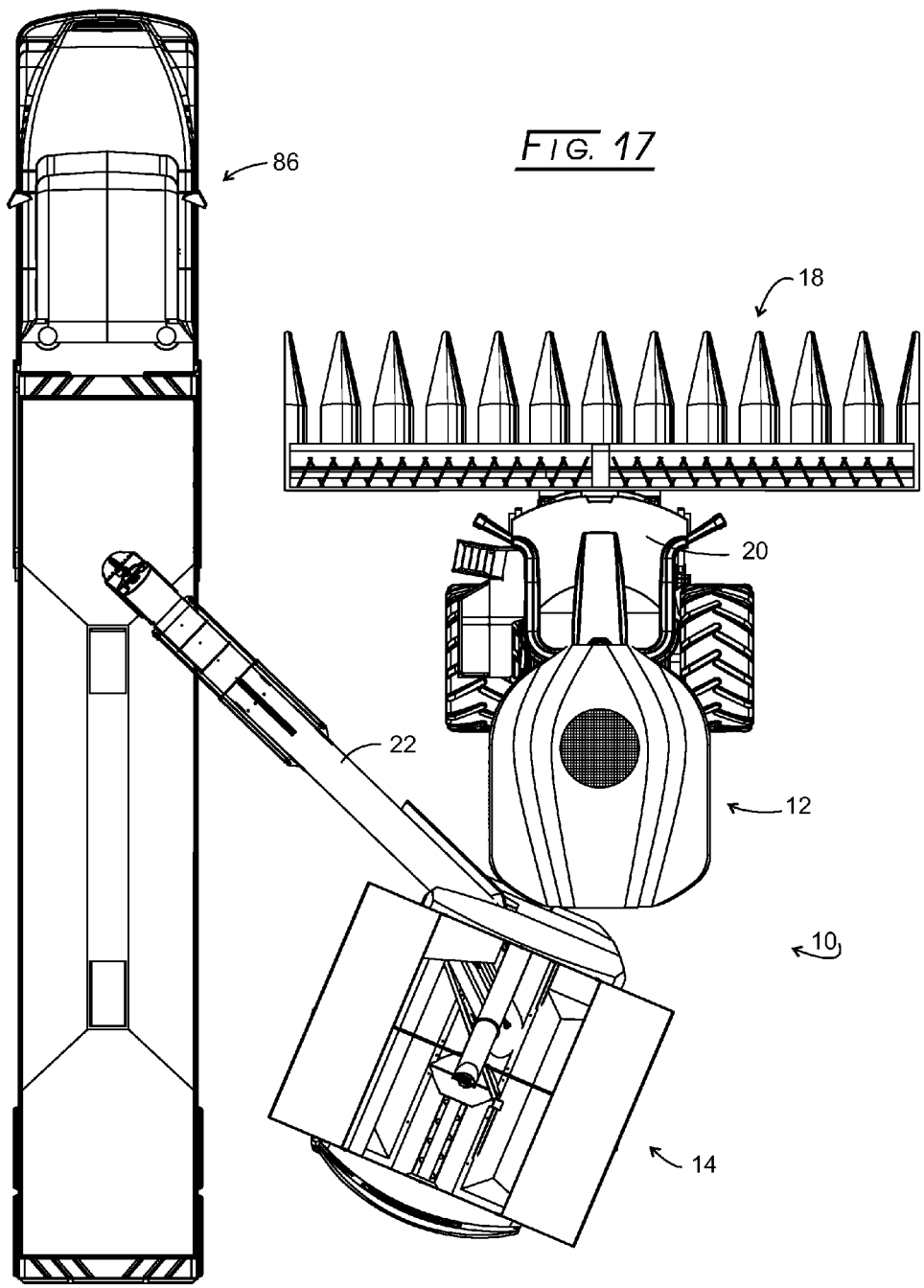

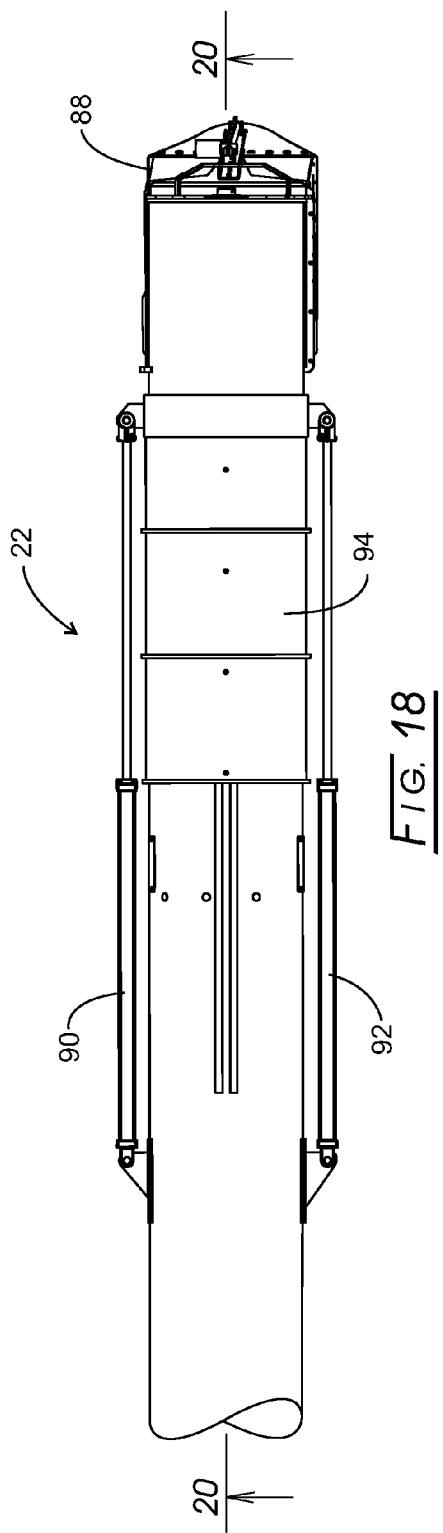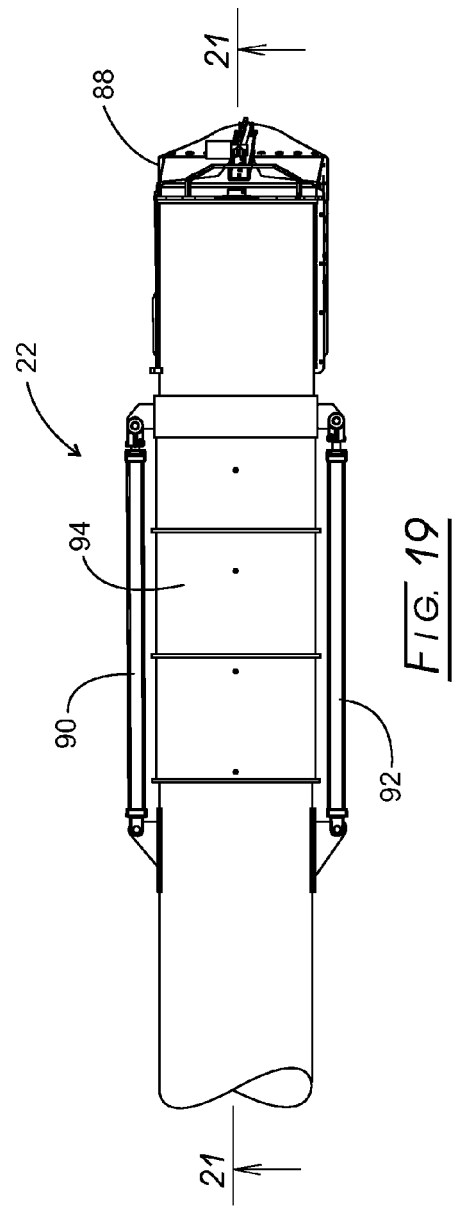

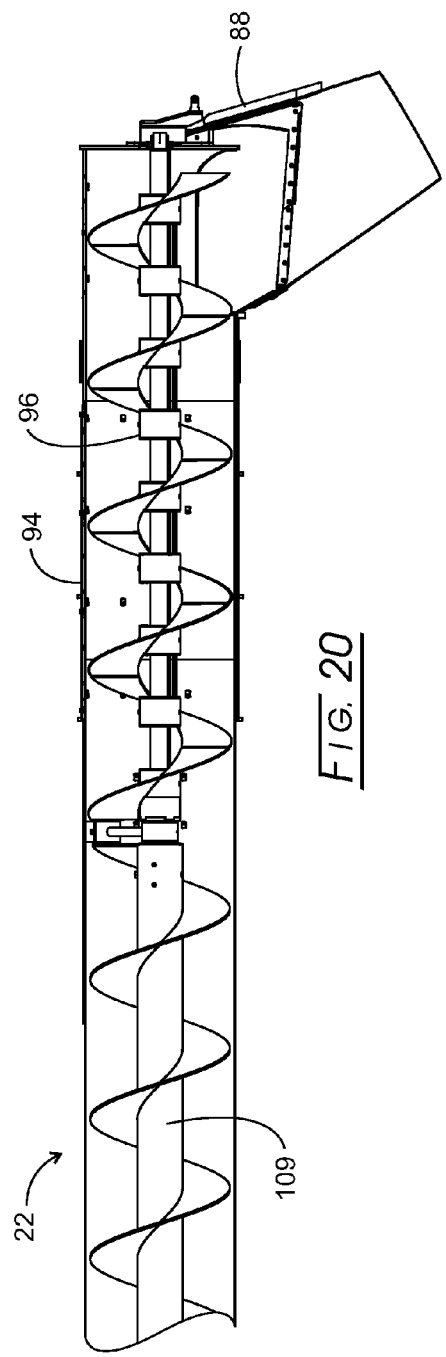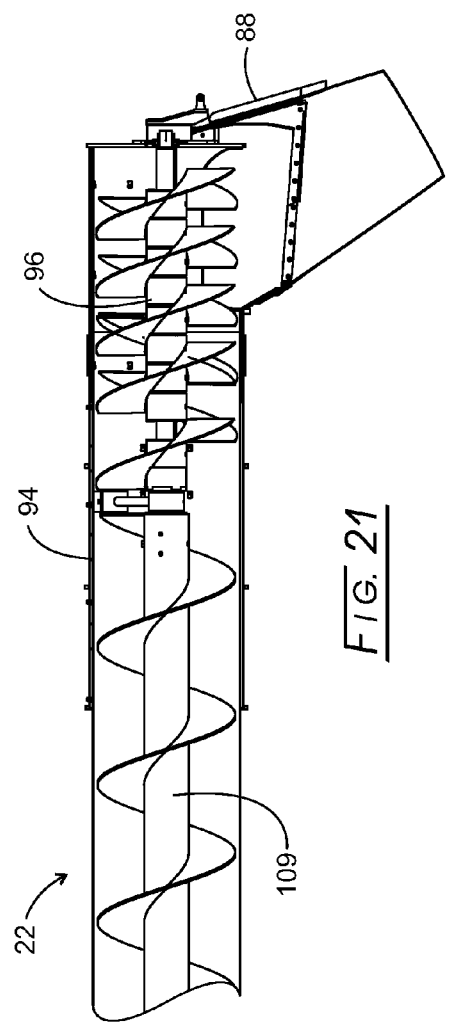

REAR GRAIN CART GRAIN HANDLING ASSEMBLIES FOR AN AGRICULTURAL HARVESTING COMBINE

CROSS-REFERENCE TO RELATED APPLICATIONS

None.

STATEMENT REGARDING FEDERALLY SPONSORED RESEARCH

Not applicable.

BACKGROUND

The present disclosure relates to a system and method to unload grain from a grain tank on an agricultural harvester to a transport vehicle, and specifically to an improved rear grain cart of an articulated agricultural harvester.

The subject of an articulated harvester, some of which are based on current commercial grain harvester designs, is disclosed in U.S. Pat. Nos. 4,317,326, 4,428,182, 6,012,272, 6,125,618, 6,339,917, 6,604,351, 6,606,844, 6,604,995, 6,604,350, 6,484,485, 6,612,101, 6,233,911, 6,240,711, 6,167,982, 7,553,228, 8,286,984, 8,292,008, and 8,435,104. A harvester/grain cart combination can be converted to an "articulated" combine as disclosed in U.S. Pat. No. 6,910,845. Various grain handling and grain unloading techniques are disclosed, inter alia, in U.S. Pat. Nos. 7,143,863 and 7,198,449. The disclosures of these patents are expressly incorporated herein by reference.

Most of the articulated combines cited above exhibit compromised design features due to the design basis being limited to current commercial grain harvester designs. For example, current commercial grain harvester designs have an onboard grain bin with the forward bogey along with grain heads, cleaners, etc. That does not make such designs faulty, as they represent a substantial advancement in the harvester art for manufactures that want to maintain current grain harvester architecture.

Current features for today's agricultural harvesters can be based on features disclosed in U.S. Pat. Nos. 8,286,984, 8,292,008, and 8,435,104.

The presently disclosed articulated combine is based on an improved rear grain cart having improved grain handling, improved design, and improved grain unloading.

BRIEF SUMMARY

Disclosed is a grain harvesting articulated combine of a forward, crop processing power unit, a rear grain cart, and an articulation joint that connects the forward unit with the rear grain cart. The rear grain cart includes an upwardly inclined lift auger assembly that receives clean grain from the forward processing unit and transports it upwardly for dumping into the rear grain cart. For grain offloading, a generally horizontal drag auger assembly moves clean grain to a lower lift auger assembly. A clean grain off-loading auger assembly is connected to the lower lift auger assembly by a slew bearing. The clean grain off-loading auger is retractable about its upper end and its upper end assembly is terminated with a spout adapted to direct clean grain generally downwardly. The clean grain off-loading auger assembly is rotatable from a grain off-loading position generally directed away from the rear grain cart to a home position generally parallel to the rear grain cart.

BRIEF DESCRIPTION OF THE DRAWINGS

For a fuller understanding of the nature and advantages of the present method and process, reference should be had to the following detailed description taken in connection with the accompanying drawings, in which:

FIG. 6 is a bottom view of the disclosed rear grain cart of the articulated combine of FIG. 1;

FIG. 7 is a sectional view taken along line 7-7 of FIG. 5;

FIG. 8 is a sectional view taken along line 8-8 of FIG. 5;

FIG. 8A in detailed enlarged view of the grain drag auger where it feeds grain up to the ascending unload auger;

FIG. 13 is a side isometric view of the slew bearing between the lower ascending section auger and the upper ascending section auger;

FIG. 13A is a detailed enlarged view of the auger intersection of FIG. 13;

FIG. 17 is an overhead top view of the articulated harvester with a crabbed rear grain cart unloading grain into a semi trailer;

FIG. 18 is a fragmentary top view of the off-loading auger assembly carried by the rear grain cart in an extended unload position;

FIG. 19 is a fragmentary view of the off-loading auger assembly carrier of FIG. 18 in a retracted position;

FIG. 20 is a sectional view taken along line 20-20 of FIG. 20;

FIG. 21 is a sectional view taken along line 21-21 of FIG. 19;

Figure 1:
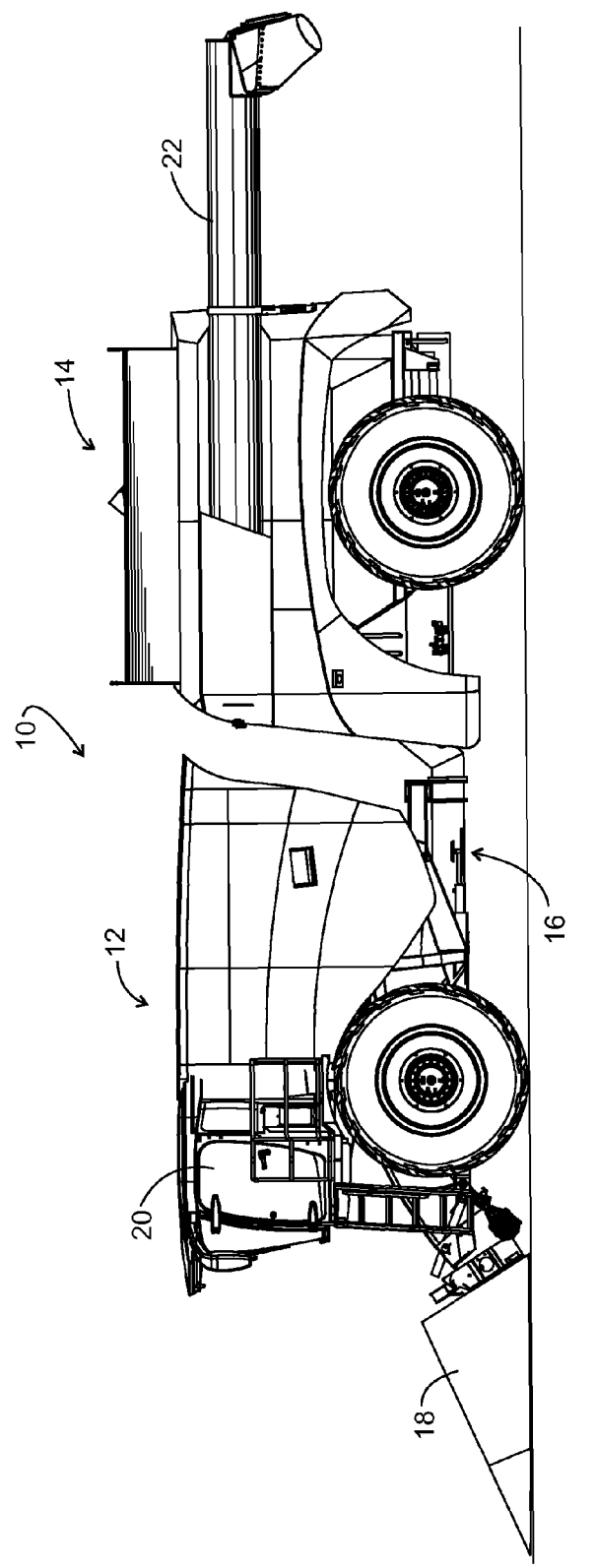
FIG. 1 is a side elevation view of an articulated combine having the disclosed grain cart.

The drawings will be described in greater detail below.

DETAILED DESCRIPTION

The articulated agricultural harvester or combine (these terms being synonymous and used interchangeably) in the drawings is a Tribine™ harvester (Tribine Industries LLC, Logansport, Ind.) having a grain bin capacity of 1,000 bushels of clean grain and unloads the clean grain at a rate of 540 bushels per minute (9 bushels/second). Normal grain removal from an elevated grain bin uses an unload auger running from the back to the front of the grain bin for transferring grain to the unload arm assembly. When grain is unloaded from the grain bin in this fashion, grain preferentially is removed from the rear of the grain bin; thus, leaving the remaining grain in the front of the grain bin. This can cause weight on the tongue (articulation joint) to increase from near zero to around 8,600 lbs. The disclosed grain cart auger feed system and unload auger system evens out grain removal and unloads virtually all of the grain in the grain cart very rapidly.

Figure 2:
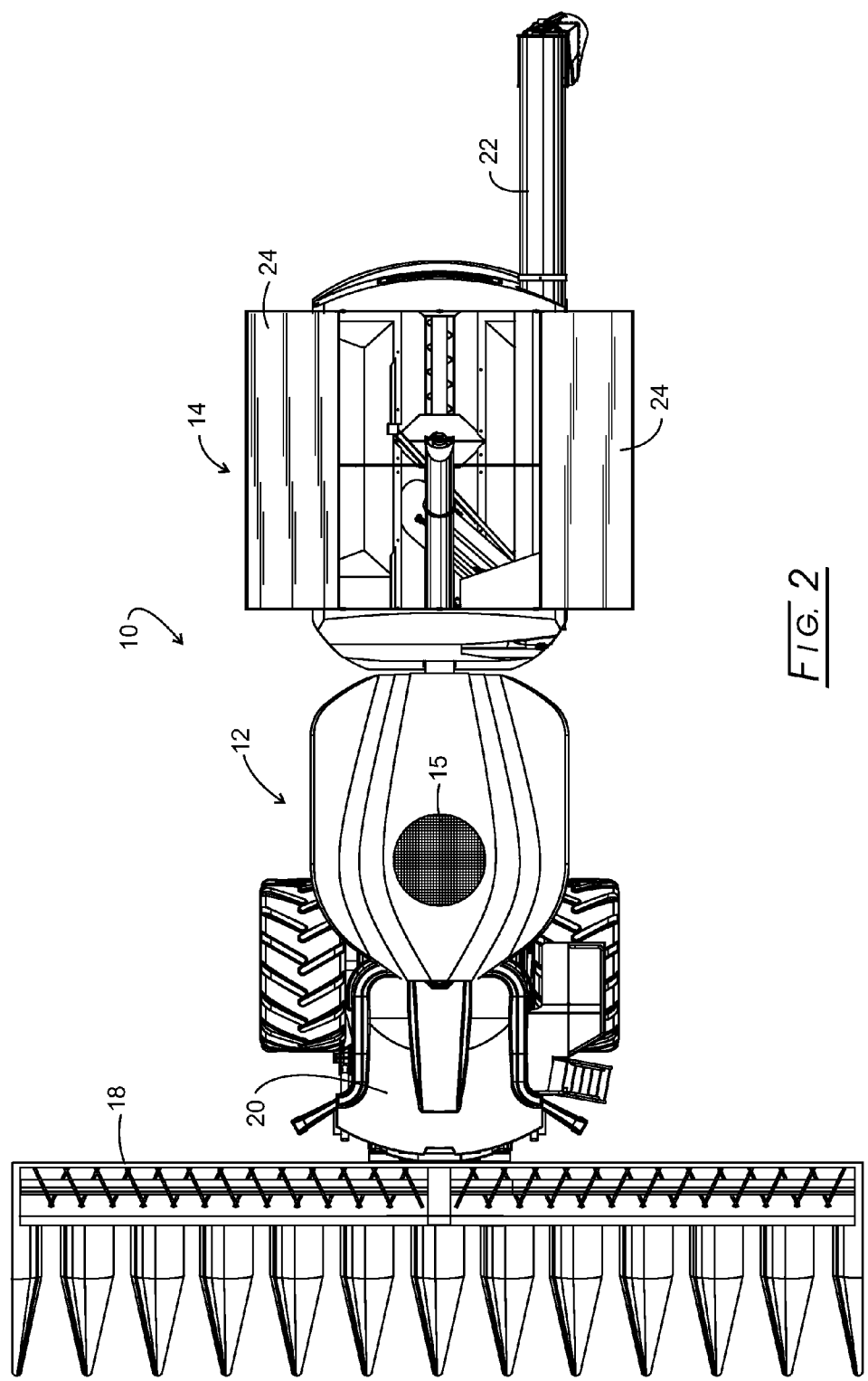
FIG. 2 is an overhead view of the articulated combine of FIG. 1.
Figure 3:
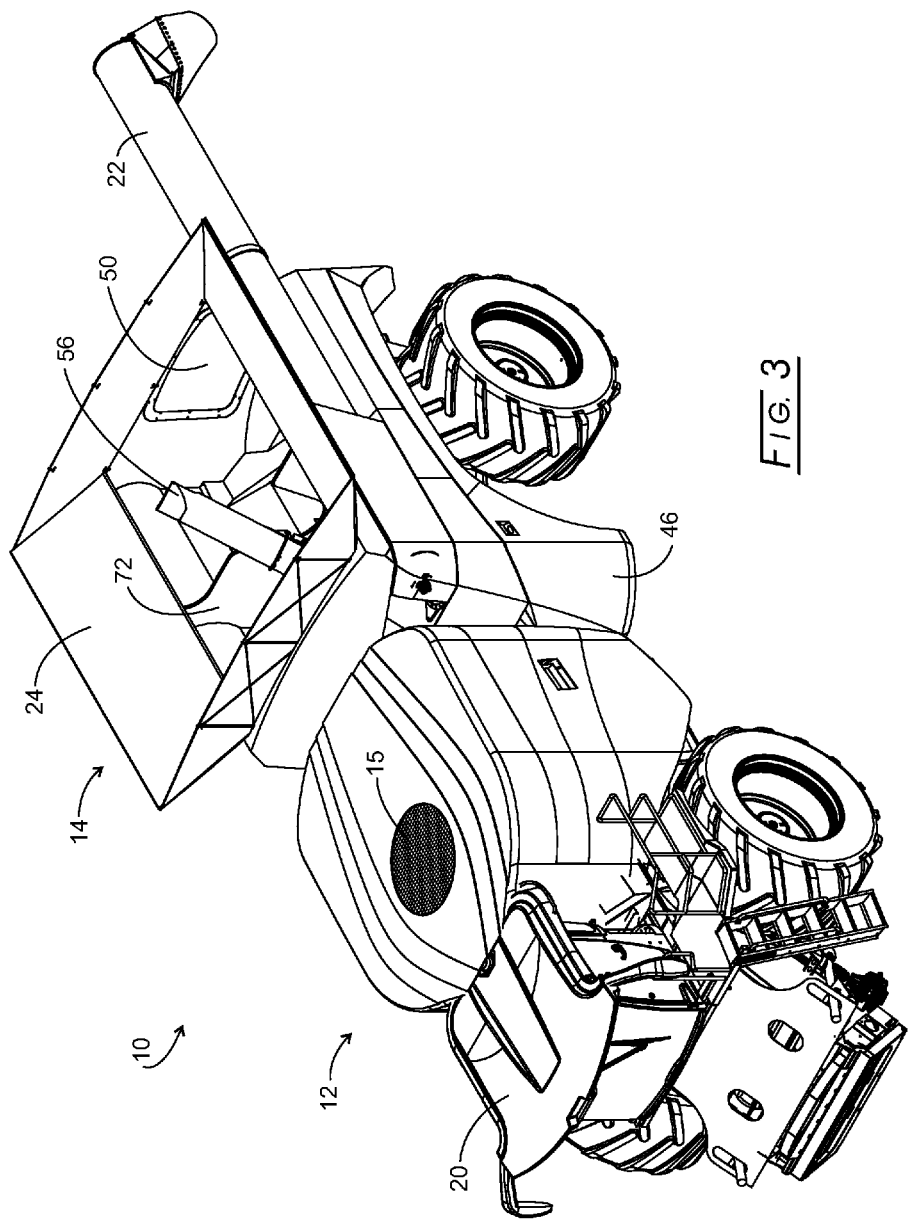
FIG. 3 is an isometric view of the articulated combine of FIG. 1.

Referring initially to FIGS. 1, 2, and 3, an articulated harvester, 10, consists of a powered forward powered processing unit (hereinafter, PPU), 12, a rear grain cart, 14, and an articulation joint, 16, that connects forward PPU 12 with rear grain cart 14. The details of articulation joint 16 and grain auger assembly 26 are disclosed in commonly owned application Ser. No. 14/946,827 filed Nov. 20, 2015. Forward PPU 12 carries a grainhead, 18, operator's cab, 20, grain cleaning and handling assembly (not shown), and engine (not shown). The grain cleaning and handling assembly in forward PPU 12 is disclosed in commonly owned application Ser. No. 14/967,691 filed Dec. 14, 2015. Forward PPU 12 is devoid of any grain storage, such being exclusive in rear grain cart 14. While both forward PPU 12 and rear grain cart 14 are shown being carried by wheel assemblies, one or both could be tracked. A screened air inlet, 15, is located atop forward PPU 12.

Figure 14:
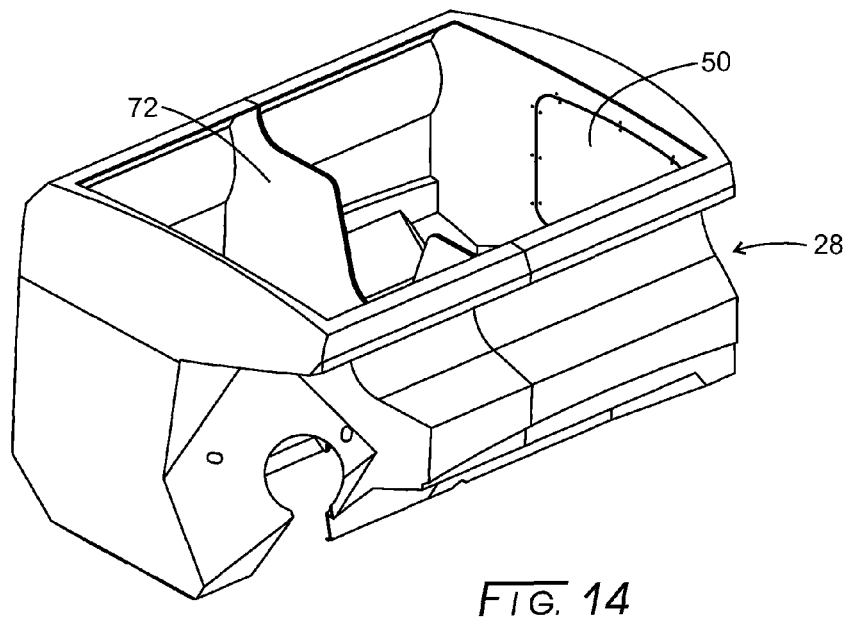
FIG. 14 is the upper shell of the disclosed grain cart.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin, 28, (see also FIG. 14) carried by grain cart 14 may be made of plastic also in keeping with desirable weight reduction; although, it could be made of metal also at the expense of weight. All plastic parts may be filled with particulate or fiber reinforcement in conventional fashion and could be laminate in construction.

Figure 4:
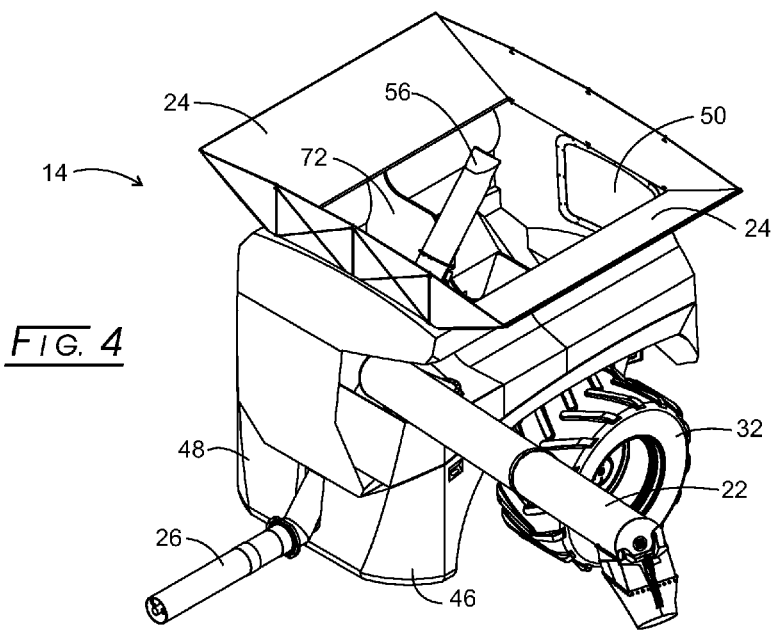
FIG. 4 is an isometric view of the disclosed rear grain cart of the articulated combine of FIG. 1.
Figure 5:
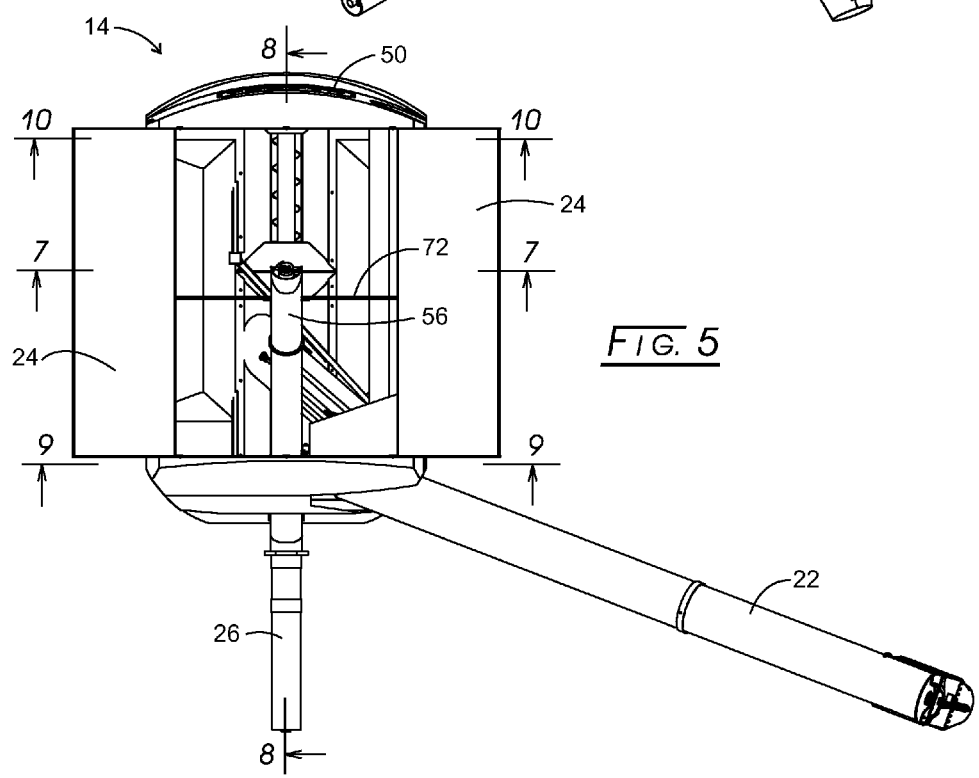
FIG. 5 is an overhead view of the disclosed rear grain cart of the articulated combine of FIG. 1.
Figure 10:
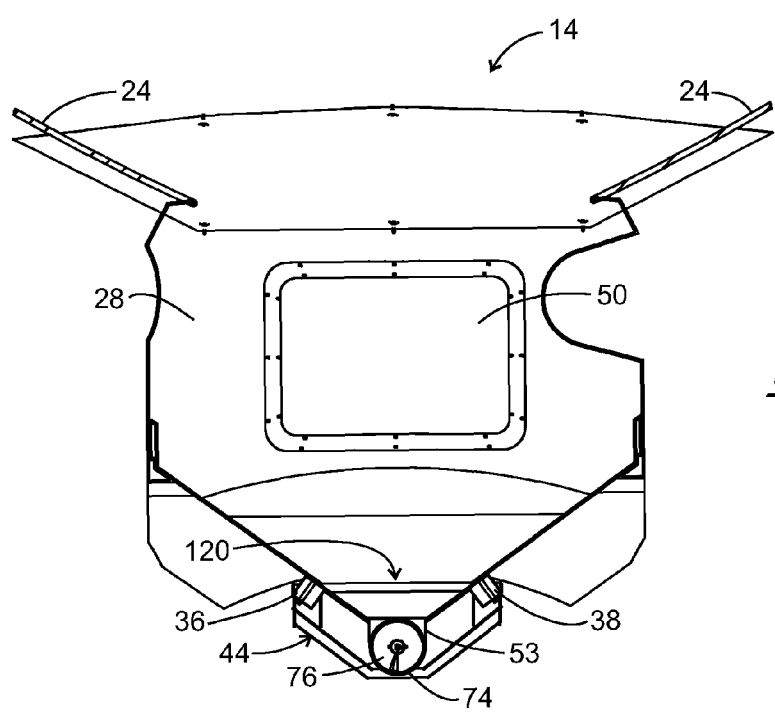
FIG. 10 is a sectional view taken along line 10-10 of FIG. 5.
Figure 11:
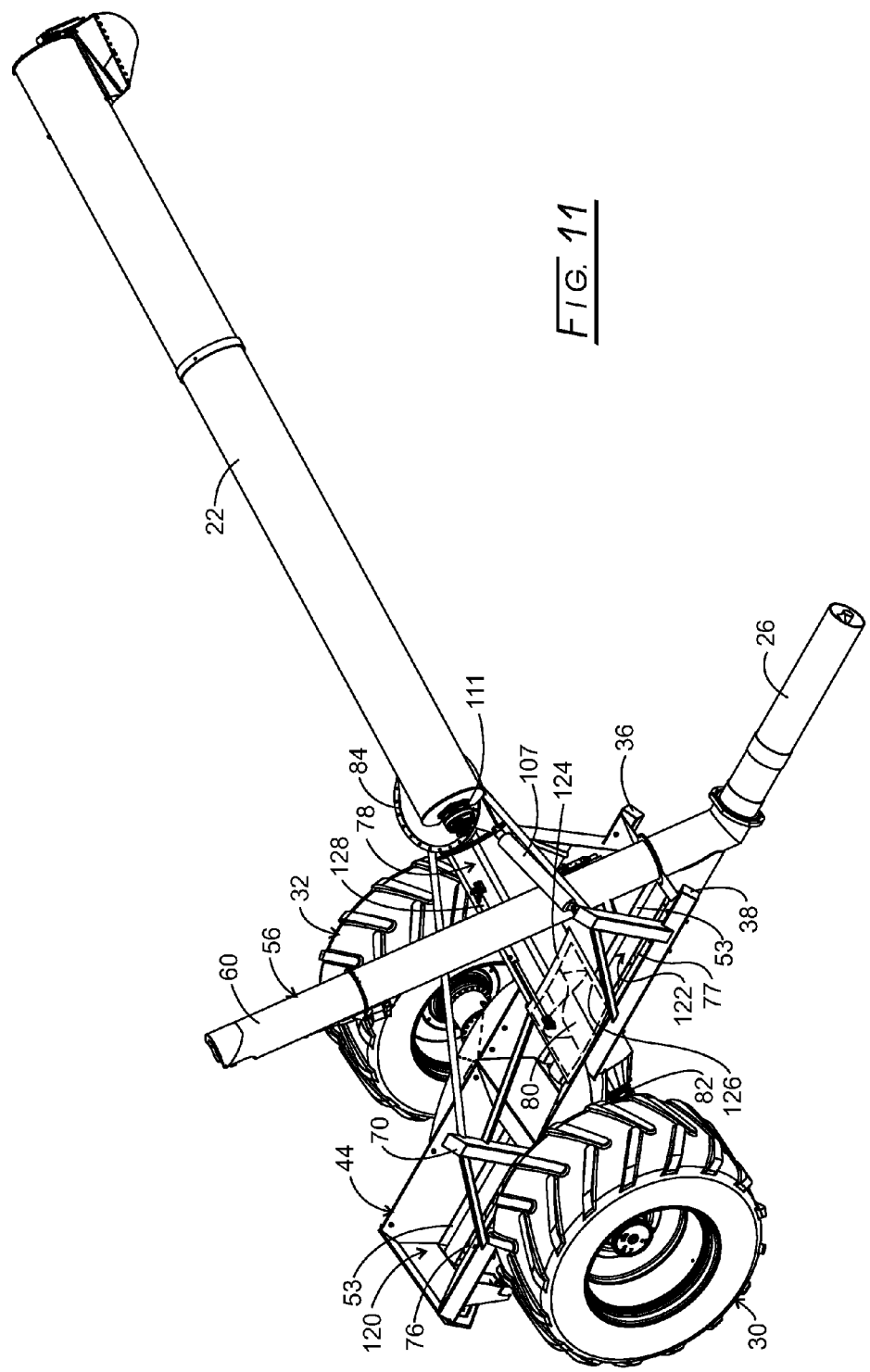
FIG. 11 is an isometric view of the grain transfer and unloading equipment of the disclosed rear grain cart of the articulated combine of FIG. 1.
Figure 15:
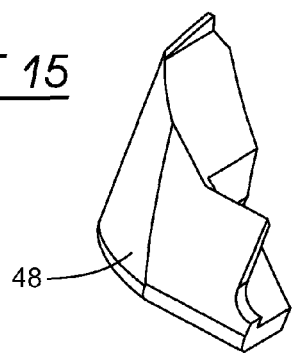
FIG. 15 is the front lower left shell panel of the disclosed grain cart.
Figure 16:
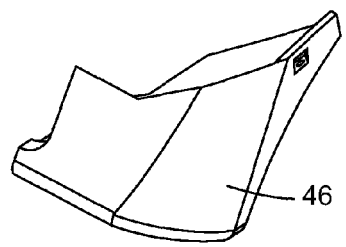
FIG. 16 is the front lower right shell panel of the disclosed grain cart.

Referring now to FIGS. 4 and 5, clean grain from PPU 12 is fed to grain cart 14 through a grain auger assembly, 26, which is part of articulation joint 16, by a motor not seen in the drawings. As seen in FIGS. 6 and 7 also, rear grain cart 14 rides on a pair of tired wheel assemblies, 30 and 32, connected by an axle assembly, 34. Hydraulic motor and gear reduction assemblies, 40 and 42, are fitted within each wheel assembly 30 and 32, respectively, for powering rear grain cart 14. Grain storage bin 28 rests atop frame supports, 36 and 38, which are part of rear grain cart frame assembly, 44. Reference also is made to FIGS. 10 and 11 to see more of frame assembly 44. Rear grain cart 14 also carries fuel tanks, 46 and 48 (see also FIGS. 15 and 16) for the engine in forward PPU 12. A hatch, 50, is located at the rear of grain storage bin 28 to provide entry into its interior for repair and maintenance purposes. Rod and piston assemblies, 52 and 54, connect to frame assembly 44, as seen best in FIG. 6. While the various auger assemblies are hydraulically powered in the drawings, electrical motors and pneumatic motors could be used. Not all lines and hydraulic motors can be seen in the drawings. A valve control manifold, 55, for rear grain cart 14 can be seen in FIGS. 1 and 6.

Referring now FIG. 8, grain auger assembly 26 feeds clean grain from forward PPU 12 to rear grain cart 14 and more specifically into an ascending fill lift auger assembly, 56, that has an lower auger section, 58, and an upper auger section, 60, so that upper section 60 of ascending fill lift auger assembly 56 can be folded to permit foldable roof 24 to fold inwardly to cover grain storage bin 28. A rod and piston assembly, 62, rotates upper auger section 60. Ascending fill lift auger assembly 56 in turn dumps clean grain into grain storage bin 28 through openings, 64, 66, and 68, located in upper auger section 60. A motor, 59, is located in the top of upper auger assembly 60 adjacent to spout 68 for powering augers 57 and 58 housed within ascending fill lift auger assembly 56. Note that motor 59 is surrounded by clean grain in ascending fill auger assembly 56 as it is moved to upper section 60 for dispersal in grain bin 28 via openings 64, 66, and 68.

Figure 9:
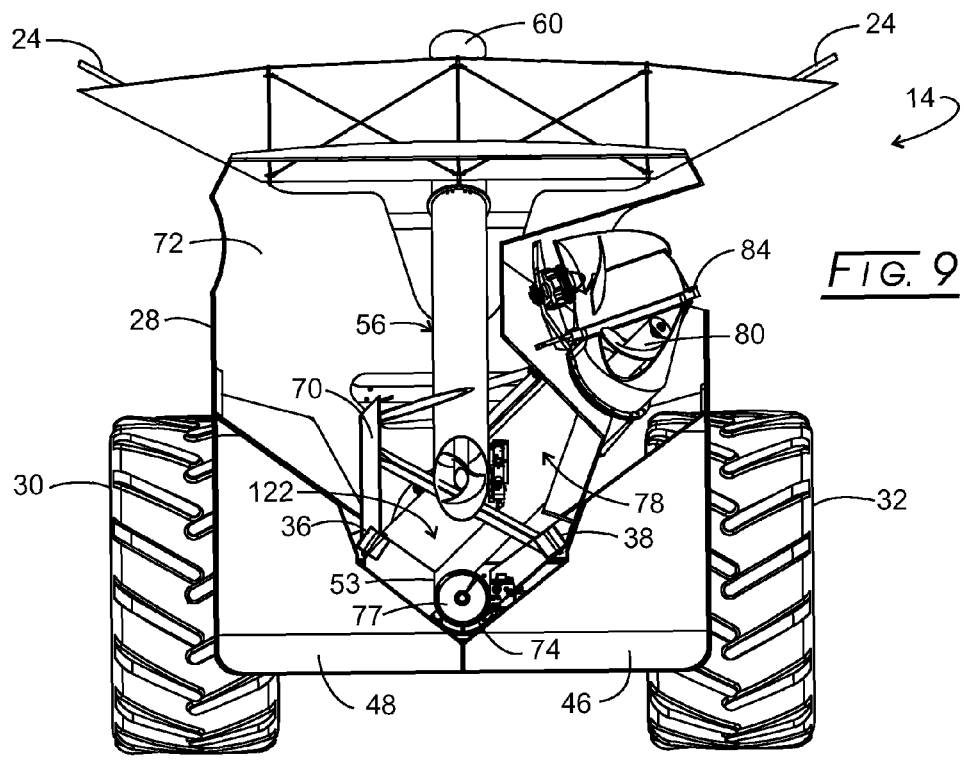
FIG. 9 is a sectional view taken along line 9-9 of FIG. 5.

Since grain storage bin 28 can be made of plastic, a support assembly, 70, may be located therewithin to ensure that the walls thereof do not over bend when filled with grain or otherwise. A support wall, 72, also is located within grain storage bin 28 from side-to-side to also support its sidewalls (see FIG. 9). Support wall 72 has a generally U-shaped dip fairly centrally located and within which upper auger section 60 fits and rests when upper auger section 60 is lowered. Support wall 72 also helps to keep the sides of grain storage bin 28 from sagging inwardly.

Also seen in FIGS. 8 and 8A is a grain drag auger assembly, 74, that includes drag augers, 76 and 77, that drag grain housed within rear grain cart 14 to the opening of an unload lift auger assembly, 78. Drag augers 76 and 77 have tapered flighting at their central ends to transition from their generally horizontal orientation to feed off-loading auger assembly 22 using a pair of half-cones, 81 and 83, to feed the initial flight(s) of a lift auger, 80, housed within lift auger assembly 78. As seen in FIG. 11 also, drag auger 76 is housed within a trough, 120, while drag auger 77 is housed within a trough, 122. Frame assembly 44 forms both troughs 120 and 122.

Note that the half conical shape half-cones 81 and 83 cause the flow of grain to be deflected upward into the lower flights of lift auger 80. Grain also can enter into drag auger assembly 78 by opening a door, 124, covering an opening, 126, by actuating a cylinder assembly, 128. Thus, grain can enter into lift auger assembly 78 from rear trough 120, front trough 122, and opening 126.

Also, at the narrow ends of the half cones (see also FIG. 12A) is a journal bearing, 85, as a part of that assembly that allows the common drag auger shaft of drag augers 76 and 77 to be supported by journal bearing 85, which in turn is bolted to a drag auger assembly housing or trough, 53 (see FIG. 7). The shafts of drag augers 76 and 77 function as a common shaft in that they are connected together and supported at their connection by journal bearing 85. A bracket assembly, 87 (see FIG. 12A) in turn is bolted to drag auger assembly trough 53 (see FIG. 7), in which drag augers 76 and 77 are housed, such that the cones and bearing will be pulled out of cart assembly along with the drag augers for easy servicing, and to allow the drag auger front and rear (opposing rotation) flights to be configured on a common shaft powered by a motor, 75. This construction arrangement permits the entire drag auger assembly (augers, journal bearing, and bracket) to be removed by pulling the assembly from the rear of the grain cart by opening an access plate, 113, located at the lower back of grain cart 14 (see FIG. 8).

Also of particular note is that grain drag auger assembly 74 passes through the middle of axle assembly 34 (see FIGS. 7 and 8). At this location, an upper pin, 101, and lower pin, 103, affix axle assembly 34 to grain drag auger assembly 74, which is a tube through axle 34. Also, a V-shaped deflection plate assembly, 105, covers the grain tube to deflect grain to either the front side or the backside over axle assembly 34. This configuration allows grain drag auger assembly 74 to be located much lower in grain cart 14 and affords a much more robust axle assembly 34 versus conventional grain cart designs where the axle would be bent downwardly to allow the drag auger assembly to be below the drag auger tube (much as the front axle of a heavy truck). By using separate pivot pins above and below the auger tube as it passes through axle assembly 34, the stability of the axle versus drive torques is actually improved due to the spread distance of the pins.

Figure 12:
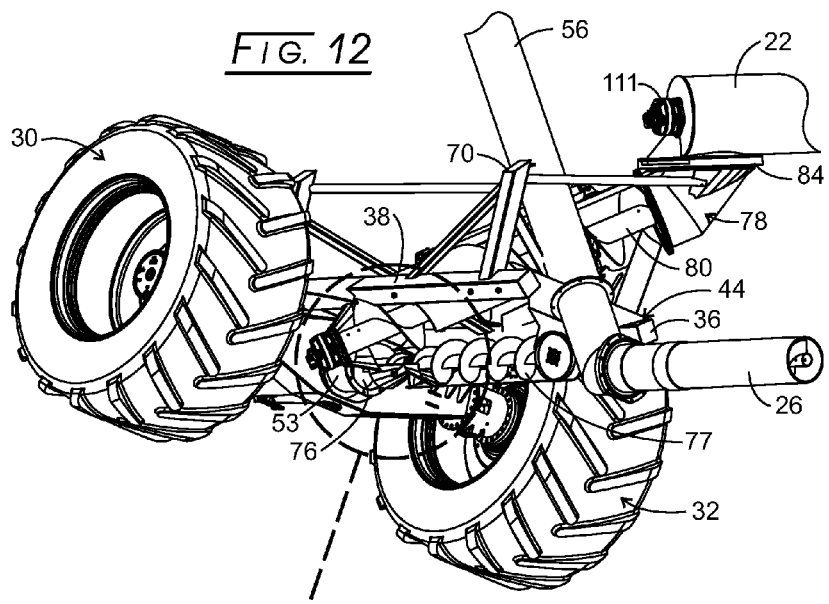
FIG. 12 is an underneath isometric view of the intersection of the grain drag auger and ascending unload auger of the disclosed rear grain cart of the articulated combine of FIG. 1.
Figure 12A:
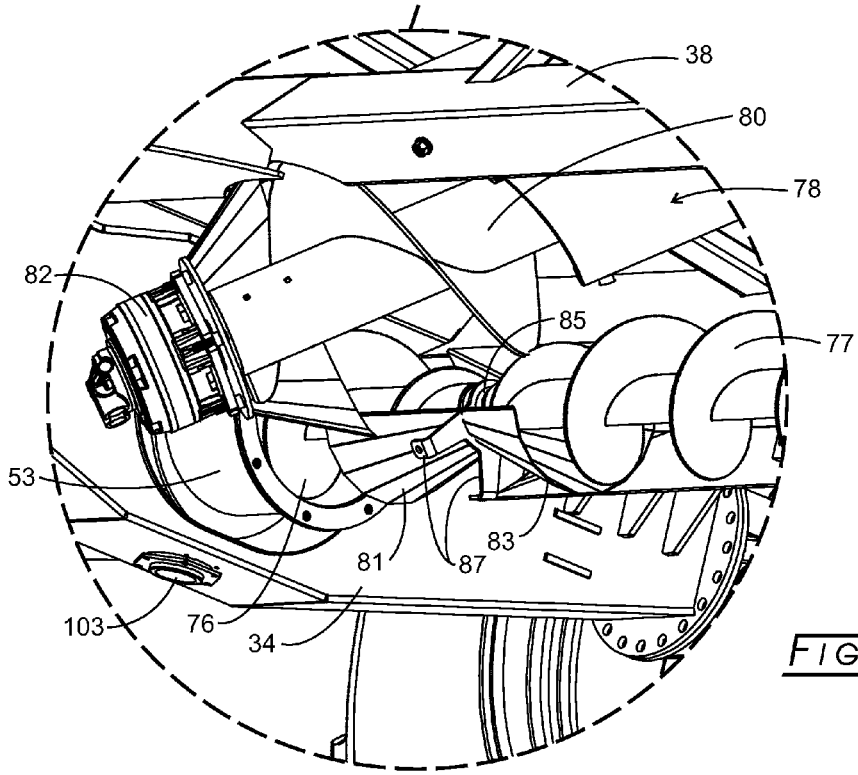
FIG. 12A is a detailed enlarged view of the auger intersection of FIG. 12.
Figure 22:
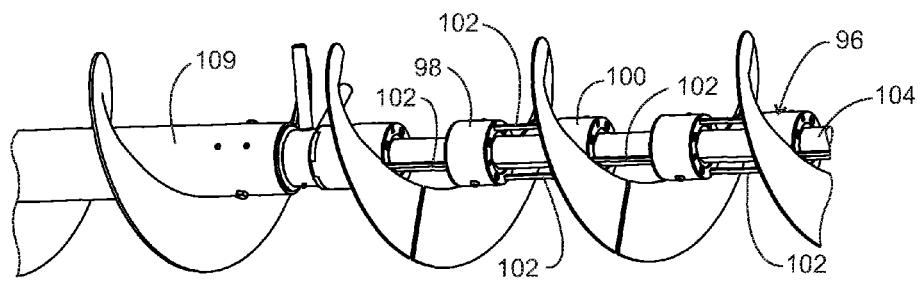
FIG. 22 is an isometric view of the grain unload auger of the off-loading auger assembly.
Figure 23:
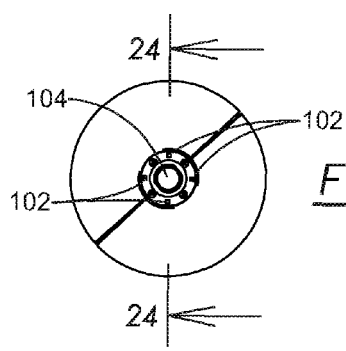
FIG. 23 is an end view of the grain unload auger of the off-loading auger assembly.
Figure 24:
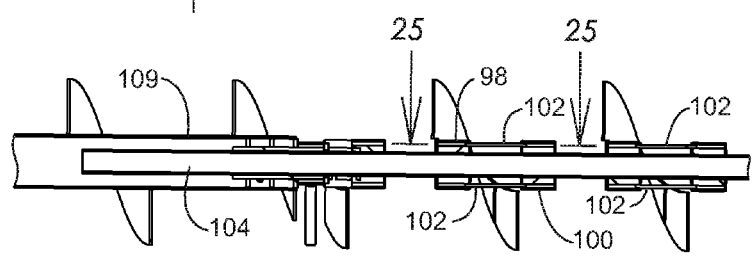
FIG. 24 is a section view taken along line 24-24 of FIG. 23.
Figure 25:
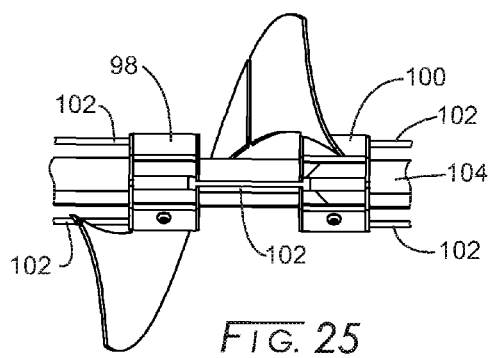
FIG. 25 is a section view taken along line 25-25 of FIG. 24 of the grain unload auger joint in an extended position.
Figure 26:
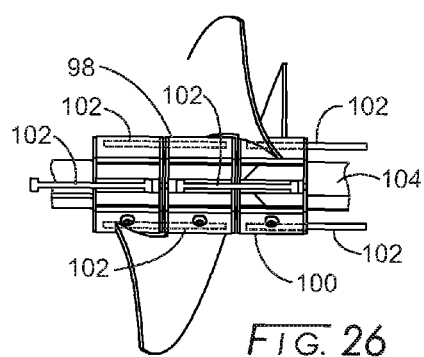
FIG. 26 is a section view like that of FIG. 25, but with the grain unload auger joint in a retracted position.

A hydraulic motor, 82, as seen in FIGS. 12 and 12A, powers auger 80. A slew bearing assembly or slewing ring bearing assembly, 84, connects unload lift auger assembly 78 to off-loading auger assembly 22, as seen in FIGS. 13 and 13A. The transition of grain flow from (lower) lift auger assembly 78 into the more horizontal swinging unloader auger assembly 22 by passing through slewing ring bearing assembly 84 (FIGS. 13 and 13A) is accomplished in a unique manner in that flights of lift auger 80 are tapered adjacent to slew bearing assembly 84 and closely approach the flights of the unload auger at an oblique angle (versus common near-90° angle). Since drive motor 82 (see FIG. 12A) of lift auger 80 is located at the bottom end of lift auger assembly 80 and off-loading auger assembly 22 swings in an arc by a piston assembly, 107 (see FIG. 11) with deployment of the off-loading auger assembly 22 outwardly and inwardly, there is no typical gear box in the grain flow to impede flow. Thereby, lift auger 80 of assembly 78 is driven by motor 82 and an off-load auger, 109 (see FIG. 22) of assembly 22, driven by a motor, 111 (see FIG. 11), are independently driven, and thereby speed variable one versus the other, and more importantly are able to be stopped independently to facilitate grain clean-out maneuvers.

The net effect of lift auger 80 tapered flights for the grain flow is that the grain flow will be "squeezed" upwardly by the force of the grain being pushed by the flight below, assisted by the tapering flights. The net of the flow characteristics is that a majority of the momentum in the grain traveling up lift auger 80 will be maintained as it transfers to the underside of off-load auger 109. With this momentum, and given that the grain is also being fed upwardly into somewhat of the side of off-load auger assembly 22, the transition should be quite smooth and power efficient, as well as volumetrically efficient. This differs from typical near 90-degree auger elbows common to other harvester unloaders where the lift auger must force the grain around the corner and into the end of the main auger. This arrangement of auger ends allows the bottom, inward end of the off-load auger 109 to be the location of the drive motor, and allows that motor to clear mechanical structure and auger tubes, which prevents needing to run power drive lines or hoses out to the end of the unload auger, while still allowing a full range of motion for the swing of the unload auger.

Referring to FIG. 17, rear grain cart 14 is in a crabbed position enabling it to move over closer to a grain semi-truck, 86, into which grain is dumped by off-loading auger assembly 22. Coincidental to the auger moving outward toward the truck during the crab steering function, note that the discharge position at the outer end of the unloader also moves more forward to a more visible position directly outward from the window door in the cab. Such grain unloading can be accomplished in the field while articulated harvester 10 still is harvesting grain and grain semi-truck 86 is driving next to it. Articulation joint assembly 16 enables the crabbing of rear grain cart 14.

Referring now to FIGS. 18 and 19, the end of off-loading auger assembly 22 is seen in an extended position for off-loading grain in FIG. 18 and in a retracted position in FIG. 19, such as when off-loading auger assembly 22 is in its home position as shown in FIG. 2. A spout, 88, terminates off-loading auger assembly 22. A pair of piston assemblies, 90 and 92, permit the extension and retraction of off-loading auger assembly 22 Such extension is accomplished due to telescoping section, 94, which along with spout 88, are retracted or extended. One such telescoping section is shown in FIGS. 18 and 19, but such number could be greater in number. It should be observed that off-loading auger assembly 22 could be fixed, as illustrated in FIG. 1 or telescoping as shown in FIGS. 20 and 21.

Referring now to FIGS. 20 and 21, lift auger 80 located within off-loading auger assembly 22 connects to collapsing auger, 96, located with telescoping sections 94. Collapsing auger 94 telescopes to an extended position seen in FIG. 20 to a collapsed position seen in FIG. 21.

FIGS. 22-26 show the auger telescoping in greater detail. In particular, collapsing auger 94 has a series of collars, exemplified by collars, 98 and 100, which also are connected by a series of pins, exemplified by a pin 102 (FIG. 22), carried by collar 98 and running into an aperture carried by collar 100. Pin 102 is pushed into collar 100 when collapsing auger 94 is retracted. Several such pins are carried by every other collar with corresponding apertured collars adjacent to such pinned collars. Similarly, a shaft, 104, of collapsing auger 96 can extend from and retract into lift auger 80.

While the apparatus and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended s. In this application all units are in the metric system and all amounts and percentages are by weight, unless otherwise expressly indicated. Also, all citations referred herein are expressly incorporated herein by reference.

We claim:
1. In a grain harvesting articulated combine of a forward crop processing power unit (PPU), a rear grain cart, and an articulation joint that connects the forward crop processing power unit with the rear grain cart, the rear grain cart which comprises:

(a) an ascending fill lift auger assembly that receives clean grain from the forward crop processing power unit and transports it upwardly and dumps the clean grain into the rear grain cart;
(b) a lower empty lift auger assembly located about the central area of the rear grain cart and having a lower port for receiving clean grain and an upper port for transfer of clean grain, and having an opening covered by a movable door for receiving clean grain from above;
(c) a generally horizontal drag auger assembly composed of a front drag auger and a rear drag auger that move clean grain in the grain cart to the lower lift auger assembly, the front drag auger and the rear drag auger adjacent to the lower lift auger assembly having semi-cones to direct the grain up and into the lower lift auger assembly; and
(c) a clean grain off-loading auger assembly connected to the lower empty lift auger assembly by a slew bearing, a clean grain off-loading auger assembly upper end assembly terminated with a spout adapted to direct clean grain generally downwardly, the clean grain off-loading auger assembly rotatable from a grain off-loading position generally directed away from the rear grain cart to a home position generally adjacent to the rear grain cart.

2. The improved grain cart of claim 1, which has a grain storage bin carried by a frame, said grain storage bin having an overhead closable and openable roof therefor.

3. The improved grain cart of claim 2, wherein said grain storage bin is subdivided by a wall that runs generally transverse to the direction of travel of said improved grain cart.

4. The improved grain cart of claim 2, wherein said ascending fill lift auger assembly is formed with two sections, an upper section and a lower section, the upper section being pivotable downwardly to a home position that rests upon said wall.

5. The improved grain cart of claim 1, which rides on a pair of wheel and tire assembly, each such assembly being driven by a hydraulic motor and gear reduction assembly.

6. The improved grain cart of claim 2, which has an access hatch located in the rear of said grain storage bin.

7. The improved grain cart of claim 1, wherein the clean grain off-loading auger is retractable at its upper end.

8. The improved grain cart of claim 5, wherein the wheel and tire assemblies are connected by an axle and wherein the front drag auger and the rear drag auger are located in an open trough except where the rear drag auger goes through the axle where the rear drag auger rests in a tube.

9. The improved grain cart of claim 1, wherein the front drag auger and the rear drag auger are supported by a journal bearing located below the ascending empty lift auger assembly.

10. The improved grain cart of claim 1, wherein ascending fill lift auger assembly has a lower section for receiving clean grain from the forward crop processing power unit and an upper section for discharging clean grain into the grain cart, wherein said ascending fill lift auger assembly includes a tube surrounding a fill lift auger, wherein a motor for said fill lift auger is located in the ascending fill lift upper section and is surrounded by clean grain to be discharged into the grain cart.

11. The improved grain cart of claim 9, wherein the journal bearing is removable attached to a trough, whereby the generally horizontal drag auger assembly can be removed from the grain cart by detaching the journal bearing from the trough.

12. The improved grain cart of claim 1, wherein clean grain off-loading auger assembly is powered by a motor and the lower lift auger assembly is powered by a separate motor, wherein the lower lift auger flight is tapered and closely approaches the flights of the clean grain off-loading auger assembly at an oblique angle, both of said motors operating independently.

13. The improved grain cart of claim 8, wherein an upper pin and a lower pin connect the tube to the axle.

14. In a grain cart into which clean grain is transferred from a forward crop processing power unit (PPU), an improvement for grain cart stability, which comprises:
(a) a pair of wheel and tire assemblies located on each side of the grain cart and connected by an axle tube; and
(b) a drag auger assembly located sufficiently low in the grain cart that it runs through the axle tube.

15. The improved grain cart of claim 14, wherein said drag auger assembly comprises a front drag auger connected to a rear drag auger that move clean grain in the grain cart to a lower lift auger assembly, the front drag auger and the rear drag auger adjacent to the lower lift auger assembly having semi-cones to direct the grain up and into the lower lift auger assembly.

16. The improved grain cart of claim 15, wherein the front drag auger and the rear drag auger are supported by a journal bearing located below a vertical empty lift auger assembly.

17. The improved grain cart of claim 16, wherein the front drag auger and the rear drag auger are located in an open trough except where the rear drag auger goes through an axle where the rear drag auger rests in a tube.

18. The improved grain cart of claim 17, wherein an upper pin and a lower pin connect the tube to the axle.

19. The improved grain cart of claim 18, wherein the journal bearing is held in place by a removable bracket, the removal of which permits the drag auger assembly to be removed from the grain cart.

* * * * *